US012719940B2

(12) United States Patent
Grover et al.

(10) Patent No.: US 12,719,940 B2
(45) Date of Patent: Aug. 25, 2026

(54) METHODS, SYSTEMS, AND COMPUTER READABLE MEDIA FOR UNIQUELY IDENTIFYING SESSION CONTEXTS FOR HANDLING SPIRAL CALLS IN A SESSION INITIATION PROTOCOL (SIP) CALL STATEFUL PROXY

(71) Applicant: Oracle International Corporation, Redwood Shores, CA (US)

(72) Inventors: Lalit Grover, Haryana (IN); Vimal Chandra Tewari, Bangalore Karnataka (IN); Jayesh Shrimali, Telangana (IN)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 775 days.

(21) Appl. No.: 17/899,383

(22) Filed: Aug. 30, 2022

(65) Prior Publication Data

US 2024/0073256 A1 Feb. 29, 2024

(51) Int. Cl.

| | |
|---|---|
| ***H04L 65/1045*** | (2022.01) |
| ***H04L 65/1069*** | (2022.01) |
| ***H04L 65/1104*** | (2022.01) |

(52) U.S. Cl.
CPC ...... *H04L 65/1069* (2013.01); *H04L 65/1045* (2022.05); *H04L 65/1104* (2022.05)

(58) Field of Classification Search
USPC .......................................................... 709/227
See application file for complete search history.

(56) References Cited

U.S. PATENT DOCUMENTS

| | | | |
|---|---|---|---|
| 7,752,315 | B2 | 7/2010 | Da Palma et al. |
| 7,937,463 | B2 | 5/2011 | Chadli |

(Continued)

FOREIGN PATENT DOCUMENTS

| | | |
|---|---|---|
| CN | 200980139215.9 | 2/2014 |
| EP | 2 175 604 A1 | 4/2010 |

(Continued)

OTHER PUBLICATIONS

Oracle Communications Core Session Manager, Version 2.1, 2022.

(Continued)

*Primary Examiner* — Vivek Srivastava
*Assistant Examiner* — Hien V Doan
(74) *Attorney, Agent, or Firm* — Jenkins, Taylor & Hunt, P.A.

(57) ABSTRACT

A method for identifying session contexts for handling spiral calls includes, at a SIP session manager, receiving, from a first node, a first SIP request message. The method further includes determining that the first SIP request message is a request for establishing a new session or subscription. The method further includes, in response to determining that the first SIP request message is a request for establishing a new session or subscription, generating a first unique identifier. The method further includes using the first unique identifier as or to generate a first session context identifier. The method further includes creating a first session context database record for the first session or subscription. The method further includes inserting the first unique identifier in a Record-Route header. The method further includes adding the Record-Route header to a first outbound SIP request message and routing the first outbound SIP request message.

16 Claims, 10 Drawing Sheets

(56) References Cited

U.S. PATENT DOCUMENTS

| | | | |
|---|---|---|---|
| 2005/0220095 | A1 | 10/2005 | Narayanan et al. |
| 2005/0276386 | A1 | 12/2005 | Ethier et al. |
| 2006/0050648 | A1 | 3/2006 | Eydelman |
| 2006/0153064 | A1 | 7/2006 | Caballero-McCann et al. |
| 2006/0189340 | A1 | 8/2006 | Sung et al. |
| 2007/0130345 | A1 | 6/2007 | Da Palma et al. |
| 2007/0130475 | A1 | 6/2007 | Sathyanath et al. |
| 2007/0253412 | A1 | 11/2007 | Batteram et al. |
| 2008/0008185 | A1 | 1/2008 | Lindgren et al. |
| 2008/0037752 | A1 | 2/2008 | Chatilov et al. |
| 2008/0080525 | A1 | 4/2008 | Chatilov et al. |
| 2008/0086566 | A1 | 4/2008 | Kumarasamy et al. |
| 2008/0089344 | A1* | 4/2008 | Jansson ............... H04L 27/2601 370/395.2 |
| 2008/0162634 | A1 | 7/2008 | Johns |
| 2008/0235380 | A1 | 9/2008 | Maes |
| 2008/0270618 | A1 | 10/2008 | Rosenberg |
| 2008/0288458 | A1* | 11/2008 | Sun ........................ H04L 65/612 |
| 2009/0003325 | A1 | 1/2009 | Lee et al. |
| 2009/0193131 | A1 | 7/2009 | Shi |
| 2009/0196183 | A1 | 8/2009 | Kakadia et al. |
| 2009/0293123 | A1 | 11/2009 | Jackson et al. |
| 2009/0313366 | A1 | 12/2009 | Nakamura et al. |
| 2010/0023625 | A1 | 1/2010 | Lee et al. |
| 2010/0042731 | A1 | 2/2010 | Sparks |

FOREIGN PATENT DOCUMENTS

| | | |
|---|---|---|
| EP | 2 311 293 B1 | 10/2015 |
| WO | WO 2006/080806 A | 8/2006 |
| WO | WO 2010/014997 A2 | 2/2010 |

OTHER PUBLICATIONS

Decision on Appeal for U.S. Appl. No. 12/534,762 (Mar. 26, 2018).
Examiner's Answer for U.S. Appl. No. 12/534,762 (Mar. 23, 2017).
Final Office Action for U.S. Appl. No. 12/534,762 (Jul. 11, 2016).
Applicant-Initiated Interview Summary for U.S. Appl. No. 12/534,762 (May 19, 2016).
Applicant-Initiated Interview Summary for U.S. Appl. No. 12/534,762 (May 10, 2016).
Non-Final Office Action for U.S. Appl. No. 12/534,762 (Feb. 22, 2016).
Decision to Grant a European Patent Pursuant to Article 97(1) EPC for European Patent Application No. 09803706.2 (Oct. 1, 2015).
Communication/Intent to Grant under Rule 71(3) EPC for European Patent Application No. 09803706.2 (Jul. 15, 2015).
Final Office Action for U.S. Appl. No. 12/534,762 (May 26, 2015).
Non-Final Office Action for U.S. Appl. No. 12/534,762 (Feb. 3, 2015).
Communication Pursuant to Article 94(3) for European Application No. 09803706.2 (Sep. 15, 2014).
Grant Notice for Chinese Application No. 200980139215.9 (Nov. 18, 2013).
European Search Report for European Patent Application No. 09803706.2 (Aug. 12, 2013).
First Office Action for Chinese Patent Application No. 200980139215.9 (Apr. 2, 2013).
Office Action for Indian Patent Application No. 1320/CHENP/2011 (Mar. 24, 2017).
Interview Summary for U.S. Appl. No. 12/534,762 (Feb. 13, 2013).
Advisory Action for U.S. Appl. No. 12/534,762 (Jan. 31, 2013).
Final Official Action for U.S. Appl. No. 12/534,762 (Jul. 20, 2012).
Non-Final Official Action for U.S. Appl. No. 12/534,762 (Dec. 13, 2011).
Communication of European publication number and information on the application of Article 67(3) EPC for European application No. 09803706.2 (Mar. 23, 2011).
Notification of Transmittal of the International Search Report and the Written Opinion of the International Searching Authority, or the Declaration for International Application No. PCT/US2009/052600 (Apr. 13, 2010).
Elwell, "Connected Identity in the Session Initiation Protocol (SIP); draft-ietf-sip-connected-identity-05.txt," SIP WG, RFC 3261, pp. 1-24 (Feb. 25, 2007).
Henrikson, "Private SIP Extension for Original Dialog Identifier," Internet Draft, draft-henrikson-sip-original-dialog-id-00, (Feb. 2002).
Rosenberg, "Request Authorization Through Dialog Identification in the Session Initiation Protocol (SIP)," Network Working Group, RFC 4538 (Jun. 2006).
Rosenberg et al., "An Invite-Initiated Dialog Event Package for the Session Initiation Protocol (SIP)," Network Working Group, RFC 4235 (Nov. 2005).
Rosenberg et al., "SIP: Session Initiation Protocol," Network Working Group, IETF RFC 3261 (Jun. 2002).
Handley et al., "SIP: Session Initiation Protocol", RFC 2543, pp. 1-143 (Mar. 1999).
Rosenberg et al., "SIP: Session Initiation Protocol", RFC 3261, pp. 1-252 (Jun. 2002).
R. Sparks, "The Session Initiation Protocol (SIP) Refer Method", Network Working Group, IETF RFC 3515, pp. 1-23 (Apr. 2003).

* cited by examiner

METHODS, SYSTEMS, AND COMPUTER READABLE MEDIA FOR UNIQUELY IDENTIFYING SESSION CONTEXTS FOR HANDLING SPIRAL CALLS IN A SESSION INITIATION PROTOCOL (SIP) CALL STATEFUL PROXY

TECHNICAL FIELD

The subject matter described herein relates to identifying session contexts for SIP calls. More particularly, the subject matter described herein relates to methods, systems, and computer readable media for uniquely identifying session contexts for handling spiral calls in a SIP call stateful proxy.

BACKGROUND

SIP is a standardized signaling protocol for establishing voice, video, and chat sessions over Internet protocol (IP) networks. The SIP protocol is defined in Internet Engineering Task Force (IETF) Request for Comments (RFC) 3261. SIP nodes referred to as proxies set up multimedia sessions on behalf of end users. As with other communications protocols, network nodes in the SIP network act as proxies on behalf of end users to set up and tear down sessions. A proxy functions as a server when processing requests from other clients or end users and as a client when making requests on behalf of other clients or end users. The terms "call" and "session" are used interchangeably herein and refer to the exchange of signaling and media communications between end users over a network.

IETF RFC 3261 defines various types of SIP proxies, including stateless proxies, transaction stateful proxies, and call stateful proxies. A stateless proxy does not maintain client or server state machines during processing of SIP requests. A transaction stateful proxy maintains transaction state but not state for the entire call. A call stateful proxy maintains state for a SIP call. A proxy is call stateful if it retains state fora dialog from the initiating INVITE to the terminating BYE request. A call stateful proxy is always transaction stateful, but the converse is not necessarily true.

A dialog is a peer-to-peer SIP relationship between two SIP user agents that persists for some time. A dialog is established by SIP messages, such as a 2xx response to an INVITE request. A dialog is identified by a Call-Id, local tag, and a remote tag. A dialog was formerly known as a call leg in IETF RFC 2543.

Many SIP entities or network nodes exist in a signaling path between originating and terminating SIP endpoints. Each entity acts as one of the above-mentioned proxies and possibly provides other functionalities. For example, an IP multimedia subsystem (IMS) serving call session control function (S-CSCF) operates as a call stateful proxy and tracks end to end sessions, which enables the S-CSCF to perform functions, such as charging data record (CDR) generation and other charging-related procedures.

A spiral is a SIP request that is routed to a proxy, forwarded onwards, and arrives once again at that proxy, but this time differs in a way that will result in a different processing decision than the original request. Typically, this means that the request's Request-URI differs from its previous arrival. Unlike a loop, a spiral is not an error condition. A typical cause for a spiral is call forwarding. For example, a user calls joe@example.com. The example.com proxy forwards the initial INVITE request for the call to Joe's personal computer, which in turn, forwards the request to bob@example.com. This request is proxied back to the example.com proxy. However, this is not a loop. Since the request is targeted at a different user, it is considered a spiral, and is a valid condition.

One problem that can occur with spirals is that the same session context identifier can be used for a SIP request received at a proxy for an original call and a SIP request that is received at the proxy when the call is forwarded back to the proxy. When a SIP call stateful proxy receives a first request for a call, it extracts or creates a call session identifier for the call. When the SIP call stateful proxy receives subsequent messages for the same call, it uses the call session identifier obtained or derived from these messages to access and update session state information for the call. In the case of a spiral, the SIP call stateful proxy receives a message when the call is forwarded back to the SIP call stateful proxy. If the message contains the same information for deriving the session context identifier as the original call, the call stateful SIP proxy will mistakenly assume the message is related to the original call and possibly overwrite state information for the original call. Over-writing state information for a call could result in a communications failure between end users.

Accordingly, in light of these and other difficulties, there exists a need for improved methods, systems, and computer readable media for identifying SIP contexts in a manner that avoids problems associated with spiral calls.

SUMMARY

A method for identifying session contexts for handling spiral calls includes, at a SIP session manager, receiving, from a first node, a first SIP request message for establishing a first session or subscription. As used herein, the term "SIP session manager" refers to a node that performs the functions of a SIP call stateful proxy. The method further includes determining that the first SIP request message is a request for establishing a new session or subscription. The method further includes, in response to determining that the first SIP request message is a request for establishing a new session or subscription, generating a first unique identifier. The method further includes using the first unique identifier as or to generate a first session context identifier. The method further includes creating a first session context database record for the first session or subscription. The method further includes inserting the first unique identifier in a Record-Route header. The method further includes adding the Record-Route header to a first outbound SIP request message and routing the first outbound SIP request message.

According to another aspect of the subject matter described herein, receiving the first SIP request message includes receiving a SIP INVITE message for establishing the first session.

According to another aspect of the subject matter described herein, receiving the first SIP request message includes receiving a SIP SUBSCRIBE message for establishing the first subscription.

According to another aspect of the subject matter described herein, using the first unique identifier as or to generate the session context identifier includes using the first unique identifier as the session context identifier.

According to another aspect of the subject matter described herein, using the first unique identifier as or to generate the first session context identifier includes using the first unique identifier in combination with SIP header parameters to generate the first session context identifier.

According to another aspect of the subject matter described herein, inserting the first unique identifier in the Record-Route header includes inserting the first unique identifier in a uniform resource identifier (URI) of the Record-Route header.

According to another aspect of the subject matter described herein, the method for identifying session contexts for handling spiral calls includes, at the SIP session manager, receiving a second SIP request message. The method further includes determining that the second SIP request message is not a request for establishing a new session or subscription. The method further includes reading the first unique identifier from a Route header of the second SIP request message. The method further includes using the first unique identifier as or to determine the first session context identifier. The method further includes using the first session context identifier to access the first session context database record.

According to another aspect of the subject matter described herein, the method for identifying session contexts for handling spiral calls includes receiving a second SIP request message for establishing a second session and including a Call-Id parameter and a From header tag equal to a Call-Id parameter and a From header tag in the first SIP request message, wherein the second session comprises a spiral call or session. The method further includes determining that the second SIP request message is a request for establishing a new session. The method further includes, in response to determining that the second SIP request message is a request for establishing a new session, generating a second unique identifier. The method further includes using the second unique identifier as or to generate a second session context identifier. The method further includes creating a second session context database record for the second session. The method further includes inserting the second unique identifier in a Record-Route header. The method further includes adding the Record-Route header to a second outbound SIP request message. The method further includes routing the second outbound SIP request message.

According to another aspect of the subject matter described herein, a method for identifying session contexts to handle spiral calls includes, at a session initiation protocol (SIP) session manager, receiving, from a first node, a first SIP request message for establishing a first session, the first SIP request message including a Call-Id and a From header tag. The method further includes determining that the first SIP request message is a request for establishing a new session. The method further includes, in response to determining that the first SIP request message is a request for establishing a new session, generating, using a source Internet protocol (IP) address and source transport layer port number associated with the first SIP request message, a first session context identifier for identifying an ingress leg of the first session. The method further includes generating, using a destination IP address and destination transport layer port number associated with the first SIP request message, a second session context identifier for identifying an egress leg of the first session, creating a first session context database record for the first session and mapped to the first and second session context identifiers. The method further includes generating and routing a first outbound SIP request message corresponding to the first SIP request message.

According to another aspect of the subject matter described herein, the method for identifying session contexts for handling spiral calls includes receiving, from a second node, a second SIP request message for establishing a second session and including a Call-Id value and a From header tag equal to a Call-Id value and a From header tag in the first SIP request message and the second session comprises a spiral call or session. The method further includes, in response to determining that the second SIP request message is a request for establishing a new session, generating, using a source IP address and source transport layer port number associated with the second SIP request message, a third session context identifier for identifying an ingress leg of the second session. The method further includes generating, using a destination IP address and destination transport layer port number associated with the second SIP request message, a fourth session context identifier for identifying an egress leg of the second session. The method further includes creating a second session context database record for the second session and mapped to the third and fourth session context identifiers. The method further includes generating and routing a second outbound SIP request message corresponding to the second SIP request message.

According to another aspect of the subject matter described herein, a system for identifying session contexts to handle spiral calls is provided. The system includes a session initiation protocol (SIP) session manager including at least one processor. The system further includes a SIP context identification manager executable by the at least one processor for receiving, from a first node, a first SIP request message, determining that the first SIP request message is a request for establishing a new session or subscription, in response to determining that the first SIP request message is a request for establishing a new session or subscription, generating a first unique identifier, using the first unique identifier as or to generate a first session context identifier, creating a first session context database record for the first session or subscription, inserting the first unique identifier in a Record-Route header, adding the Record-Route header to a first outbound SIP request message, and routing the first outbound SIP request message.

According to another aspect of the subject matter described herein, the first SIP request message comprises a SIP INVITE message for establishing the first session.

According to another aspect of the subject matter described herein, the first SIP request message comprises a SIP SUBSCRIBE message for establishing the first subscription.

According to another aspect of the subject matter described herein, the SIP context identification manager is configured to use the first unique identifier as the session context identifier.

According to another aspect of the subject matter described herein, the SIP context identification manager is configured to use the first unique identifier in combination with a From header tag and a Call-Id to generate the first session context identifier.

According to another aspect of the subject matter described herein, the SIP context identification manager is configured to insert the first unique identifier in a request uniform resource identifier (URI) or a user portion of the Record-Route header.

According to another aspect of the subject matter described herein, the SIP context identification manager is configured to receive a second SIP request message, determine that the second SIP request message is not a request for establishing a new session or subscription, read the first unique identifier from the second SIP request message, use the first unique identifier as or to determine the first session context identifier, use the first session context identifier to locate and access the first session context database record.

According to another aspect of the subject matter described herein, the SIP context identification manager is configured to receive, from a second node, a second SIP request message for establishing a second session and including a Call-Id parameter equal to a Call-Id parameter in the first SIP request message, wherein the second session comprises a spiral call or session, the SIP context identification manager is further configured to determine that the second SIP request message is a request for establishing a new session, in response to determining that the second SIP request message is a request for establishing a new session, generate a second unique identifier, use the second unique identifier as or to generate a second session context identifier, create a second session context database record for the second session, insert the second unique identifier in a Record-Route header, add the Record-Route header to a second outbound SIP request message, and route the second outbound SIP request message.

According to another aspect of the subject matter described herein, the SIP session manager comprises a SIP call stateful proxy.

According to another aspect of the subject matter described herein, a non-transitory computer readable medium having stored thereon executable instructions that when executed by a processor of a computer control the computer to perform steps is provided. The steps include, at a session initiation protocol (SIP) session manager, receiving, from a first node, a first SIP request message for establishing a first session or subscription. The steps further include determining that the first SIP request message is a request for establishing a new session or subscription. The steps further include in response to determining that the first SIP request message is a request for establishing a new session or subscription, generating a first unique identifier. The steps further include using the first unique identifier as or to generate a first session context identifier. The steps further include creating a first session context database record for the first session or subscription. The steps further include inserting the first unique identifier in a Record-Route header. The steps further include adding the Record-Route header to a first outbound SIP request message. The steps further include routing the first outbound SIP request message.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Exemplary implementations of the subject matter described herein will now be explained with reference to the accompanying drawings, of which.

DETAILED DESCRIPTION

Identifying session contexts in the case of spiral calls can lead to conflicts. The subject matter described herein is applicable to an IMS deployment scenario where an S-CSCF, acting as a call stateful proxy, is connected to an application server (AS) that functions as a back-to-back user agent (B2BUA). It is noted, however, that the subject matter described herein applies to any non-IMS deployment as well in which a call stateful proxy forwards the call to any downstream B2BUA.

Call stateful proxies store and maintain information referred to as session contexts about active/ongoing sessions and are thus required to correlate incoming signaling requests in an existing session to a stored session context database record so that they can apply charging, policy, and other related functions. The term "session manager" is also intended to refer to a session border controller (SBC) that performs session management functions and participates in SIP signaling. IETF RFC 3261 provides a standard way for SIP user agents or proxies to identify a dialog by using request header parameters as a unique key to compute a dialog identifier. A dialog or session on a proxy server involves two call legs—the ingress leg (where the initial INVITE is received) and the egress leg (where the initial INVITE is routed). Since the session manager typically proxies the requests without changing the relevant header parameters, requests exchanged on either side (ingress or egress) of the session carry the same Call-Id and tags and hence lead to the same dialog identifier that can uniquely identify the corresponding session context. Basic implementations of a session manager may construct the dialog Id using the following header parameters as specified by IETF RFC 3261 and use the dialog Id as a unique key for searching a stored session context.

Call-Id
From header tag
To header tag

The key used by the session manager to identify a session context database record is hereinafter referred to as the session context identifier or SCI.

Figure 1:
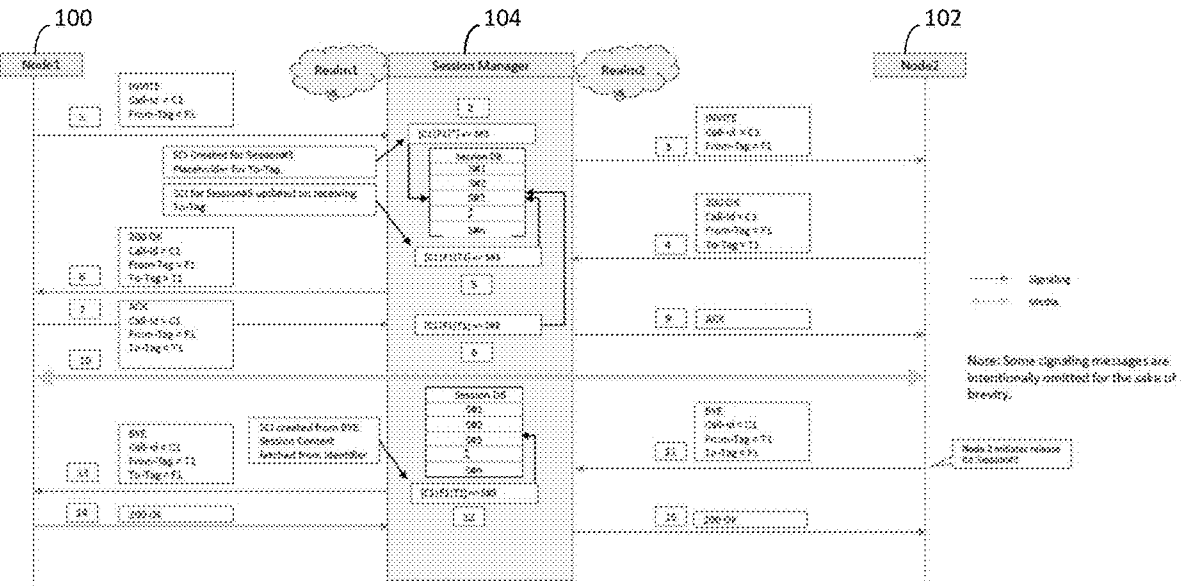
FIG. 1 is a message flow diagram illustrating exemplary SIP signaling when the dialog Id is used as the session context identifier.

FIG. 1 illustrates the use of the dialog ID as a session context identifier. In step 1 of FIG. 1, node1 100, which may be a proxy call session control function (P-CSCF), sends a SIP INVITE message to node2 102 via a session manager 104. The SIP INVITE message includes a Call-Id of C1 and a From header tag of F1. The SIP INVITE message does not include a To header tag. In step 2, session manager 104 receives the SIP INVITE message and generates a temporary key for the To header tag to be replaced with the To header tag received in the 200 OK response. In step 3, session manager 104 forwards the SIP INVITE message to node2 102. In step 4, node2 102 response to the SIP INVITE message in step 3 with a 200 OK message. The 200 OK message includes a Call-Id of C1, a From header tag of F1, and a To header tag of T1. In step 5, session manager 104 receives the 200 OK message, computes the SCI using C1, F1, and the temporary key for the To header tag, locates the record, updates the temporary key for the To header tag with the To header tag T1, and updates the SCI using C1, F1, and T1. Thus, in the example in FIG. 1, the From header tag, the To header tag, and the Call-Id (in other words, the dialog Id) are used to compute the SCI.

In step 6, session manager 104 forwards the 200 OK message to node1 100. In step 7, node1 100 sends an ACK message to node2 102. In step 8, session manager 104 receives the ACK message and updates the stored state information for the session. In step 9, session manager 104 forwards the ACK message to node2 102. After step 9, a bidirectional media session is established between node1 100 and node2 102, as indicated by step 10.

In step 11, node2 102 initiates release of the media session by sending a BYE message to node1 100. In step 12, session manager 104 receives the BYE message, uses C1, F1, and T1 to compute the session context identifier, and updates the session context. In step 13, session manager 104 sends the BYE message to node1 100.

In step 14, node1 100 sends a 200 OK message to node2 102. In step 15, session manager 104 forwards the 200 OK message to node2 102.

It should be noted that in FIG. 1, for requests received on the egress leg of the call, the From and To headers are swapped as compared to the initial INVITE. Session manager 104 is smart enough to construct the same key to look up the session context information regardless of the order of the tags. In other words, the key is order-insensitive, and this allows session manager 104 to map requests coming from either side of the call to the same session context. However, using the dialog Id as the session context identifier may not work in some scenarios, one of which is illustrated in FIG. 2.

Figure 2:
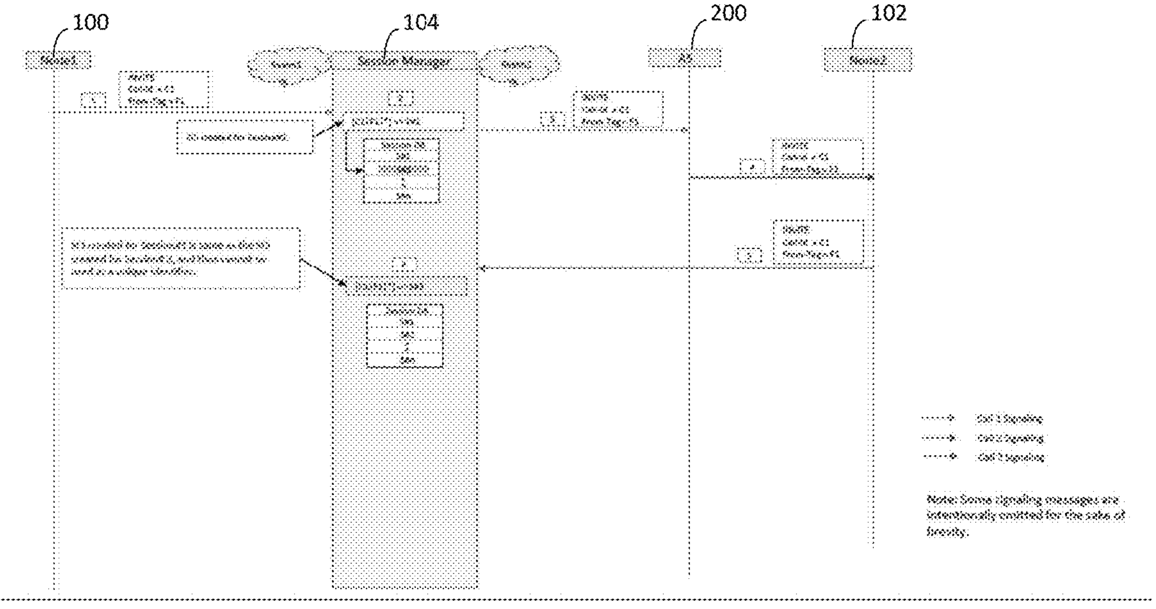
FIG. 2 is a message flow diagram illustrating exemplary SIP signaling when the dialog Id is used as the session context identifier and a spiral call received by the session manager uses the same dialog Id as the original call.

In FIG. 2, node1 100 initiates a call C1 in step 1 by sending an INVITE message to session manager 104. In step 2, session manager 104 creates the dialog Id using the From header tag and Call-Id from the INVITE message. In step 3, session manager 104 proxies the incoming call to AS 200, which applies services to the call based on the profile of the originating user and, in step 4, originates a second call to node2 102. It should be noted that in step 4, AS 200 does not assign a new Call-Id or tags to the second call.

In step 5, node2 102 loops the call back to session manager 104 so that the call can be forwarded to the called party. AS 200, being a back-to-back user agent, treats the ingress and egress sides of the call as two separate dialogs and thus typically would change the Call-Id and tags in the outgoing secondary call. If AS 200 generates a new Call-Id (which AS 200 did not do in step 4), session manager 104, on receipt of the new request from node2 102 would generate a new SCI based on the modified header and create a mapping between the new SCI and the new session context. However, there are cases or scenarios in which AS 200 and node2 102 would use the same Call-Id and tags from the original call for the new call and loop the call back to the session manager 104. In such cases, the implementation described above in which the dialog Id is used as the SCI will cause session manager 104 to generate the same SCI as that of the original session, as shown in step 6 of FIG. 2. As a result, depending on the implementation, session manager 104 could either end up unintentionally overwriting the original session context with the new session context or rejecting the new session request coming from AS 200 (since session manager 104 would find an existing session context mapping for the generated SCI, which it does not expect for the new call). Both of these actions are incorrect and would lead to an undefined or incorrect behavior. The problem may not surface at this point for some implementations that choose to create the session context mapping only after a final response is received and the To header tag is available. However, the same problem will manifest itself once the final response (with the same To header tag as the original call) is received for the new call.

The call or session that is looped back to session manager 104 by sending a new INVITE request to session manager 104 is referred to as a spiral call. Some specifications suggest using the via header to identify a spiral call. For example, IETF RFC 3261, Section 16.3 suggests an optional loop detection check in step 4 as part of SIP request validation. However, in the case mentioned above with respect to FIG. 2, it is likely that the application server, being a back-to-back user agent, does not relay all of the via headers from the original call to the new call. Also, even if the session manager identifies the second call as a spiral call, it would still be a challenge to determine a unique SCI for the second call that can be used to differentiate the second call from the original call.

Figure 3A:
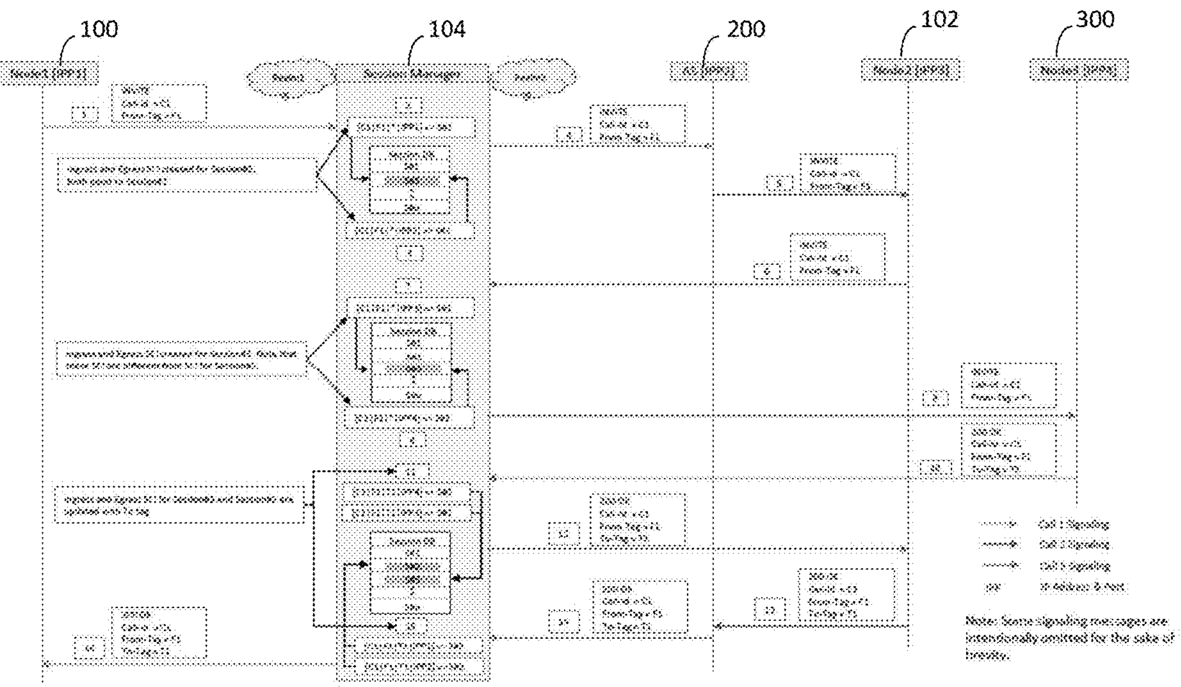
FIGS. 3A and 3B are a message flow diagram illustrating exemplary SIP signaling in which the IP address and port number of a sending client or a receiving server are used to compute the session context identifier.

One possible solution to this problem will now be described with respect to FIGS. 3A and 3B where the session manager uses the IP address and port number of the client/server endpoints for generation of the SCI. Such an implementation creates two keys for each session. One key represents the ingress leg of the session and uses the IP address/port number of the client node that originates the initial session creating request message. The other key represents the egress leg of the session and uses the IP address/port number of the server to which the initial session creating request is addressed. As can be seen in FIG. 3A, the keys (IPP1 and IPP2 in step 2 and step 3) to the session context for the original call are different from the keys (IPP3 and IPP4 in step 7 and step 8) to the session context for the spiral call. This solution enables the session manager to differentiate between the original call and the second call and uniquely map an incoming request to one of these sessions regardless of whether the request is coming from the ingress or the egress side of that session.

Referring to the message flow in FIG. 3A, in step 1, node1 100 sends a SIP INVITE message to session manager 104 to initiate a first call. The SIP INVITE message includes the Call-Id C1 and is carried in an IP packet with a source IP address and source transport layer port number which are symbolically illustrated in FIG. 1 as IPP1. It is understood that the IP address would be a 32 bit number in the case of IPv4 or a 128 bit number in the case of IPv6. The source port number is typically a 16 bit number carried in the transport layer header of the message.

In step 2, session manager 104 receives the SIP INVITE message and creates the SCI for the ingress leg of the call C1 using IPP1 obtained from the IP packet and the transmission control protocol (TCP), stream control transmission protocol (SCTP), or user datagram protocol (UDP) datagram carrying the SIP INVITE message. In step 3, session manager 104 creates a second key IPP2 using the destination IP address and destination port number for the egress leg of the call C1. IPP2 is generated using the IP address and port number of AS 200 that session manager 104 uses for the signaling for the egress leg of the call C1.

In step 4, session manager 104 sends the SIP INVITE message to AS 200. In step 5, AS 200 initiates a new call to node2 102. Node2 102 is assumed to have the IP address and port number IPP3. In step 6, node2 102 loops the call back to session manager 104 by sending a SIP INVITE message to session manager 104. In step 7, session manager 104 uses the source IP address and source port number IPP3 obtained from the IP packet carrying the SIP INVITE message in step 6 as components to generate the ingress SCI for session #3. In step 8, session manager 104 uses the destination IP address and destination port number IPP4 to generate the egress SCI for session #3. In step 9, session manager 104 sends a SIP INVITE message to node3 300 to create the egress call leg for session #3. In step 10, node3 300 sends a 200 OK message to session manager 104 in response to the SIP INVITE message in step 9. In step 11, session manager 104 receives the 200 OK message and updates the ingress SCI and egress SCI for session #3 with the To header tag received in the 200 OK message in step 10.

In step 12, session manager 104 sends a 200 OK message to node2 102 in response to the SIP INVITE message in step 6. In step 13, node2 102 sends a 200 OK message to AS 200 in response to the INVITE message in step 5. In step 14, AS 200 sends a 200 OK message to session manager 104 in response to the INVITE message in step 4. In step 15, session manager 104 receives the 200 OK message and updates the ingress SCI for session #2 with the To header tag received in the 200 OK message in step 14. In step 16, session manager sends a 200 OK message to node1 100 in response to the SIP INVITE message in step 1.

Figure 3B:
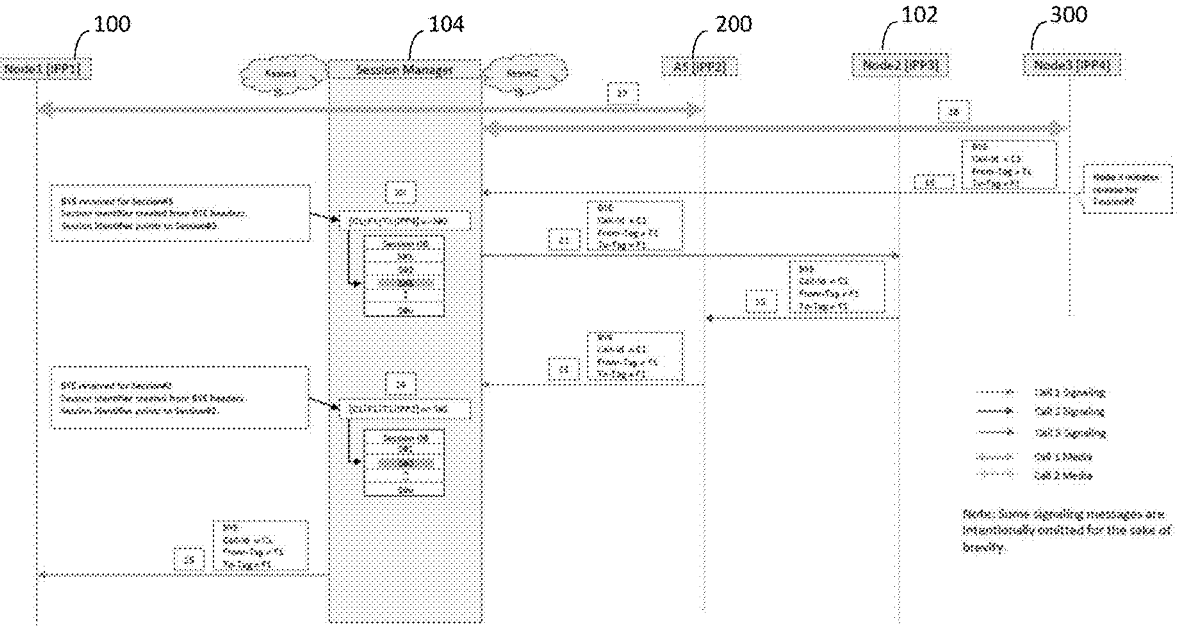

Referring to FIG. 3B, which continues the call flow in FIG. 3A, in step 17, based on the signaling in FIG. 3A, a bidirectional media session is established between node1 100 and AS 200. In step 18, a bidirectional media session is established between session manager 104 and node3 300.

In step 19, node3 300 initiates a release for session #3by sending a BYE message to session manager 104. In step 20, session manager 104 receives the BYE message for session #3, determines the session context identifier from the source IP address and source port number from the BYE message and updates the stored session information for session #3 in the session database maintained by session manager 104.

In step 21, session manager 104 sends a BYE message to node2 102. In step 22, node2 102 sends a BYE message to application server 200. In step 23, application server 200 sends a BYE message to session manager 104. In step 24, session manager 104 receives the BYE message and determines the session context identifier from the source IP address and source port number and other information in the BYE message. Session manager 104 determines that the BYE message relates to session #2 and updates the stored session state information for session #2 in the session database. In step 25, session manager 104 sends a BYE message to node1 100.

Thus, FIGS. 3A and 3B illustrate the case where the client or server IP address and port number are used in combination with the Call-Id and the From and To header tags to generate a unique SCI for each leg of a session. While this solution works when the application server uses a unique IP address and port number for the second call routed to session manager 104, the solution will fail if application server 200 routes the second call to session manager 104 from the same source IP address and port on which application server 200 received the signaling for the original call. This is different from the case in FIG. 2 where the second call was forwarded to node2 102, which looped the call back to session manager 104.

Figure 4:
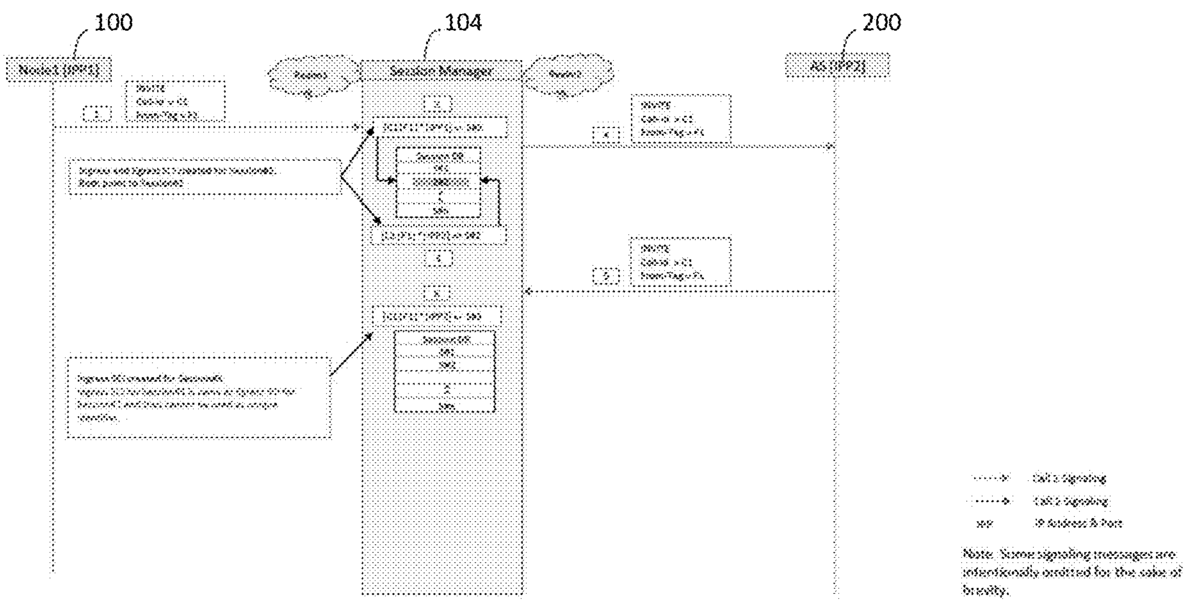
FIG. 4 is a message flow diagram illustrating exemplary SIP signaling where using the IP address and port number of a sending client and a receiving server as the session context identifier fails to uniquely identify a session.

FIG. 4 illustrates one case where using the server and client IP addresses and port numbers as the session context identifier fails to uniquely identify a session. Referring to FIG. 4, in step 1, node1 100 sends a SIP INVITE message to session manager 104. In step 2, session manager 104 creates an SCI for the ingress call leg using IPP1 obtained from the IP address and port number of the IP packet/UDP datagram carrying the SIP INVITE message. In step 3, session manager 104 creates an SCI for the egress call leg using IPP2, which is the IP address and port number used by application server 200 for call signaling on the egress leg from session manager 104. In step 5, application server 200 sends a SIP INVITE message from the same IP address and port number that application server 200 received the SIP INVITE message in step 4. In step 6, session manager 104 creates the SCI for session #3. However, the ingress SCI for session #3 is the same as the egress SCI for session #2 and thus cannot be used as a unique identifier.

Some implementations may use the realm and/or ingress/egress indicator as constituents for generating the key to identify a session context. However, none of these would help in the scenario described with respect to FIG. 4.

To reduce the likelihood of the problems mentioned above, in one example, the subject matter described herein includes an approach for SIP call stateful proxies to uniquely identify and differentiate between the original/primary call and consequent spiral calls carrying the same headers regardless of from where the spiral call originates.

In explaining the proposed solution, the concepts of the Record-Route header, the Route header, and route set in the SIP protocol will now be described. A route set is a collection of ordered SIP or SIPS URIs which represent a list of proxies that must be traversed when sending a particular request. As specified in IETF RFC 3261, a Record-Route header field is inserted by proxies in a request to force future requests in the same dialog to be routed through the proxy. RFC 3261 mandates user agent server implementations to set the route set to the list of URIs in the Record-Route header field from the request, taken in order and preserving all URI parameters. The user agent server must also copy all Record-Route header field values from the request into the response (including the URIs, URI parameters, and any Record-Route header field parameters, whether they are known or unknown to the user agent server (UAS)) and must maintain the order of those values. User agent client implementations are required to set the route set to the list of URIs in the Record-Route header field from the response, taken in reverse order and preserving all URI parameters. This route set is then added as a sequence of Route headers in all subsequent requests originated by the user agent client (UAC) or the UAS in the existing sessions. These Route headers are then used by intermediate proxies to route requests. As per IETF RFC 3261, the topmost Route header or request URI (if the upstream node is a strict router) in all subsequent requests received by a proxy would carry the contents of the Record-Route header previously added by the proxy.

Since a session manager maintains a session context, the session manager would always want to be in the path of all future requests that are part of an existing session. It is therefore logical for the session manager to generate and insert a Record-Route header in every outbound INVITE (or any other request) meant to create a new session. As mentioned above, the topmost Route header or request URI (if the upstream node is a strict router) in all subsequent requests received by the session manager would carry the same contents as the Record-Route header added by the session manager for the respective session.

The subject matter described herein proposes that the session manager create a unique identifier and embed the unique identifier in the Record-Route header inserted in an outgoing INVITE or other session creating request, such as a SUBSCRIBE request. The unique identifier can be added as a new parameter in the URI of the Record-Route header or can be encoded or included in the user portion of URI of the Record-Route header. Including the unique identifier in the user portion of the Record-Route header does not incur any overhead since including the unique identifier in the user portion of the Record-Route header does not require the sending of any additional bytes in the header.

The unique identifier embedded in the Record-Route header is used by the session manager to construct the SCI. Depending on the implementation, the unique identifier can serve as the SCI, or the unique identifier can be used with other SIP header parameters (such as the From header tag and the Call-Id) to construct the SCI.

It should be noted that a new SCI may only be created for new INVITE and out-of-dialog SUBSCRIBE requests, i.e., the ones without a To header tag. Upon receipt of any subsequent requests in an existing session (i.e., with the To header tag present), the session manager will extract the unique identifier from the topmost Route header or request URI of the received request and use the unique identifier to construct an SCI or use the unique identifier as is to uniquely identify the correct session context maintained by the session manager.

Figure 5A:
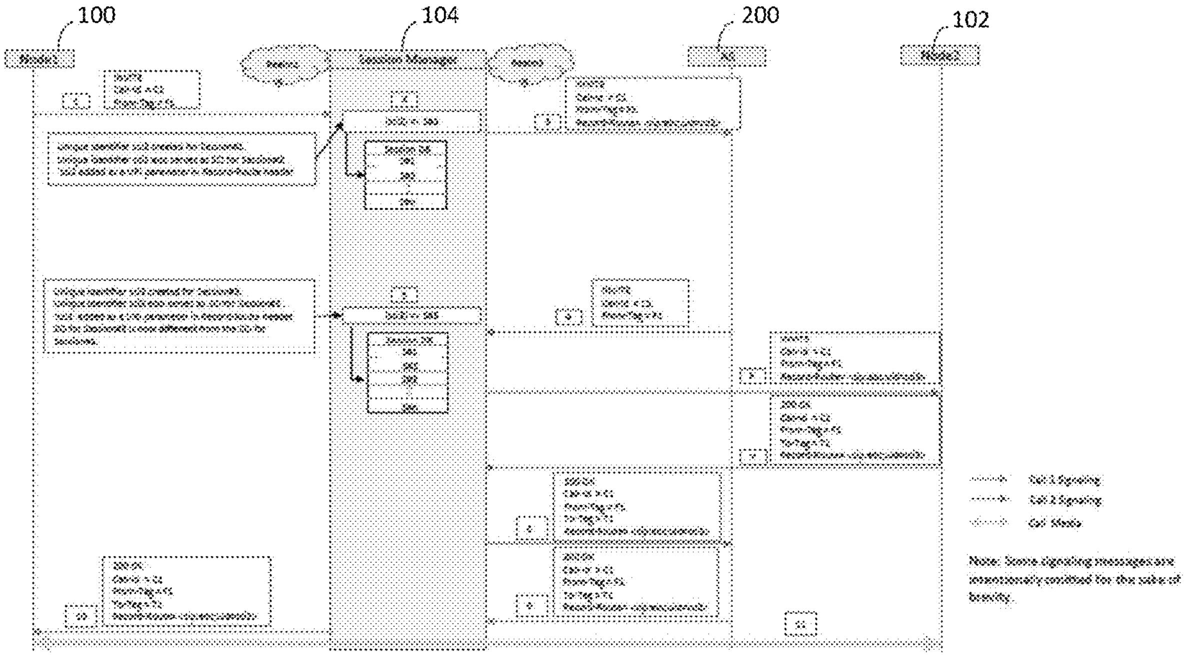
FIGS. 5A and 5B are a message flow diagram illustrating exemplary messages exchanged in generating, communicating, and using a session context identifier to uniquely identify session contexts.
Figure 5B:
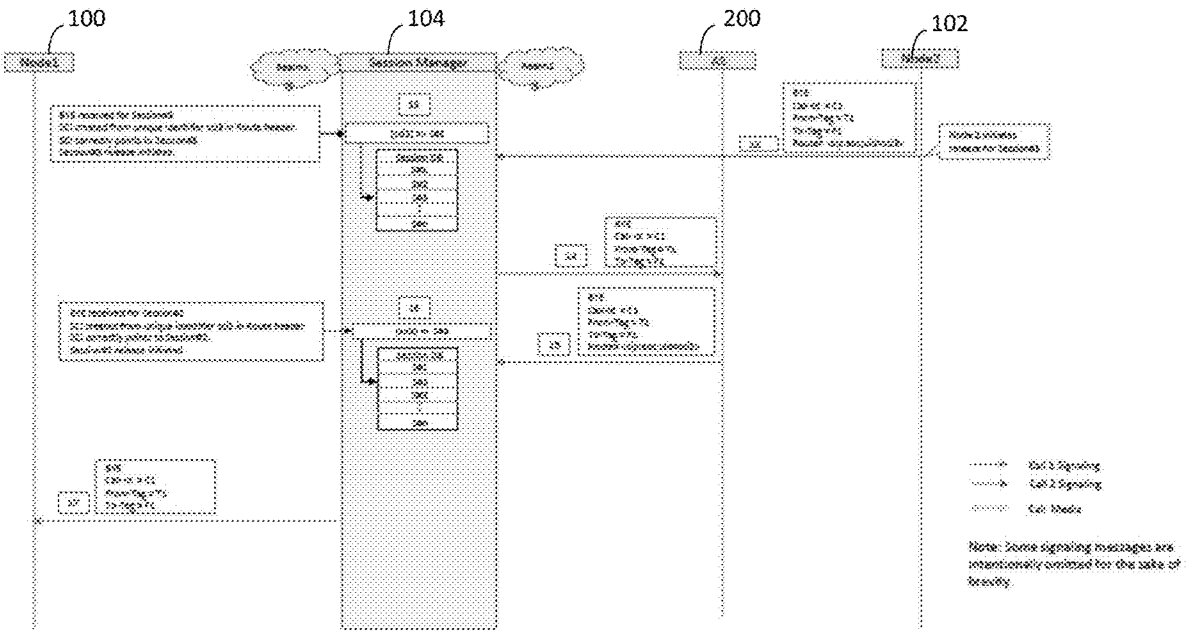

FIGS. 5A and 5B illustrate an example implementation that uses a unique identifier as the SCI, where the SCI is added to the URI of the Record-Route header of an outbound SIP request message for creating a new session. In one example, the SCI may be a hash of predetermined SIP header fields (e.g., From header tag and Call-Id) along with a random number, which can be generated once at the time of creating a new session context and then embedded in the Record-Route header.

In another implementation, a unique cookie, such as an epoch timestamp, can be inserted in the user portion or URI field of the Record-Route header, along with the Call-Id and tags. The unique cookie may be used in combination with the Call-Id and the From header tag to construct an SCI.

Referring to the message flow in FIG. 5A, in step 1, node1 100 sends a SIP INVITE message to create a new session to session manager 104. In step 2, session manager 104 creates the unique identifier for the session and adds the unique identifier as a URI parameter in the Record-Route header of the outbound SIP INVITE message. The unique identifier can be constructed using any of the methods described above. Session manager 104 also creates a new session context database record for the session and adds information from the SIP INVITE message to the session context database record. The unique identifier can be used as the session context identifier or used to generate the session context identifier along with other SIP message parameters, such as the From header tag and the Call-Id. In FIG. 5A, the session context identifier created in response to the SIP INVITE message in step 1 is illustrated symbolically as sci2, and the session is labeled as session #2.

In step 3, session manager 104 routes the SIP INVITE message with the unique identifier in the Record-Route header to AS 200. In step 4, AS 200 sends a SIP INVITE message to session manager 104 to create a new session. The new session is considered a spiral call because the session is related to the original session and sent back to the session manager that received the SIP INVITE message for the original session. Because the SIP INVITE message in step 4 is a message to create a new session, session manager 104 creates a new unique identifier for session #3 and adds the unique identifier to the URI parameter in the Record-Route header of the outbound SIP request message. The SCI for session #3 is different from the SCI for session #2 despite the fact that AS 200 uses the same Call-Id as the one used to identify the incoming call. In FIG. 5A, the SCI for session #3 is illustrated symbolically as sci3.

In step 6, session manager 104 sends a SIP INVITE message to node2 102 with the unique identifier for session #3 carried in the Record-Route header. In step 7, node2 102 responds to the INVITE message in step 6 with a 200 OK message. The 200 OK message includes a Record-Route header with the unique identifier for session #3 in the URI parameter. Session manager 104 receives the 200 OK message and updates the session context database record for session #3. In step 8, session manager 104 sends a 200 OK message in response to the INVITE message in step 4 and includes the unique identifier for session #3 in the Record-Route header. In step 9, AS 200 sends a 200 OK message to session manager 104. The 200 OK message is sent in response to the INVITE message in step 3 and includes the unique identifier for session #2 in the Record-Route header. Session manager 104 receives the 200 OK message and updates the session context for session #2 to reflect the fact that the 200 OK message was received. In step 10, session manager 104 sends a 200 OK message to node1 100 in response to the INVITE message in step 1. After step 10, a bidirectional media session is created between node1 100 and node2 102, as indicated by step 11.

Referring to FIG. 5B, in step 12, node2 102 sends a BYE message to session manager 104 to release session #3. In step 13, session manager 104 uses the unique identifier in the Route-Header to identify the session context for session #3 and update the session context database record to reflect the release of session #3. In step 14, session manager 104 sends a BYE message to AS 200 to release session #2. In step 15, AS 200 sends a BYE message to session manager 104. In step 16, session manager 104 uses the unique identifier in the Route-Reader of the BYE message as the SCI or to generate the SCI, uses the SCI to locate the session context database record for session #2, and updates the session context database record for session #2. In step 17, session manager 104 sends a BYE message to node1 100.

It should be noted that the problem of identifying a session context and hence the proposed solution is relevant only in the context of subsequent request messages, not responses. In FIG. 5B, the BYE messages are examples of subsequent request messages. The responses are correlated to the corresponding request using transaction identifiers. In FIG. 5A, the 200 OK messages are examples of response messages that session manager 104 identifies using transaction identifiers. A session manager manages transaction state machines that are used to process an end to end transaction starting from the request to the final response.

Figure 6:
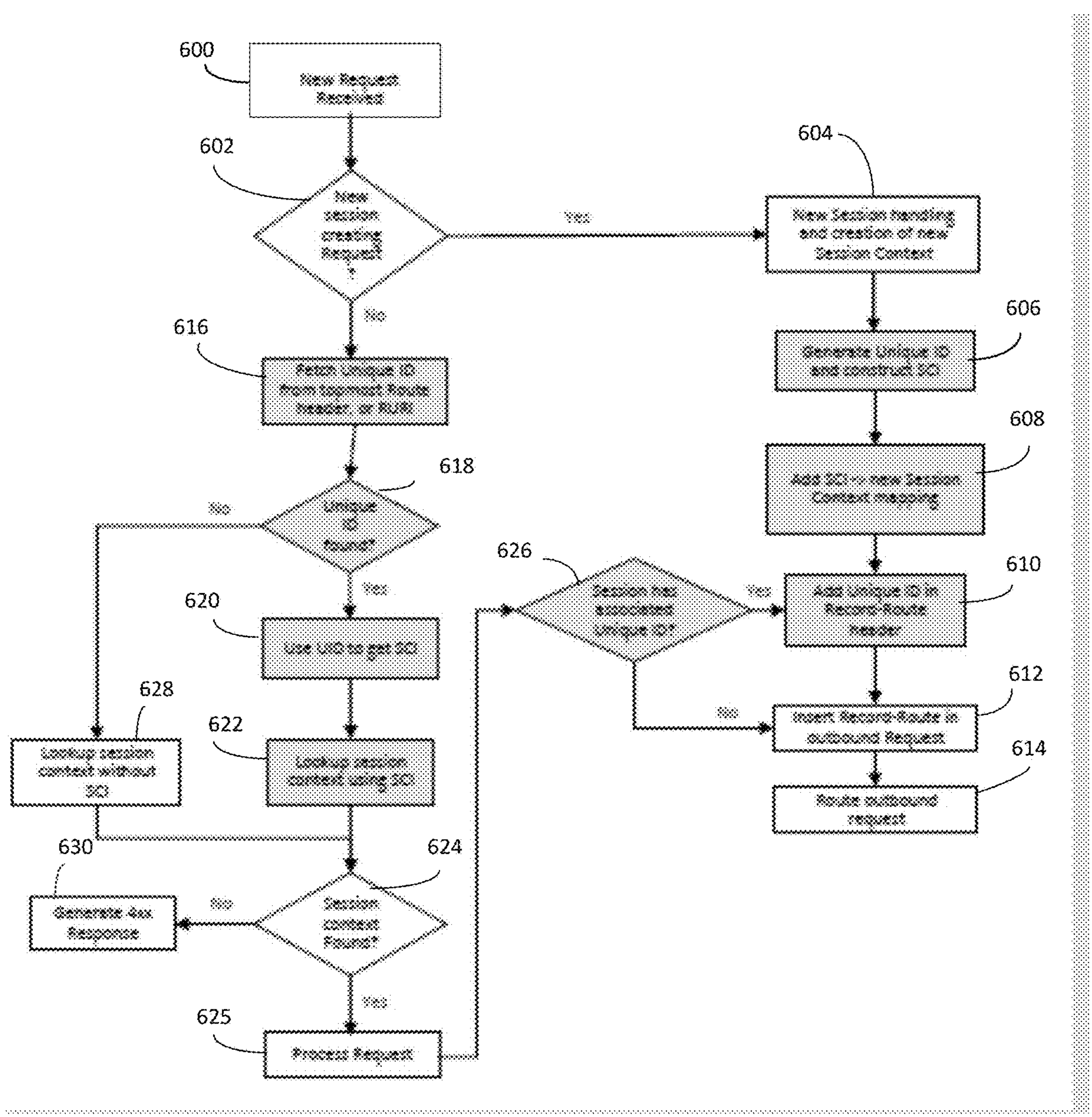
FIG. 6 is a flow chart illustrating an exemplary process performed by a session manager in generating, communicating, and using a session context identifier.

FIG. 6 is a flow chart illustrating an exemplary process for generating and using unique session context identifiers. The steps illustrated in FIG. 6 may be performed by session manager 104. Referring to FIG. 6, in step 600, a new request is received by session manager 104. In step 602, session manager 104 determines whether the request is a new session creation request. If the request is a new session creation request, control proceeds to step 604 where new session handling and creation of a new session context begins. In step 606, session manager 104 generates a unique identifier and uses the unique identifier to construct the SCI. In step 608, session manager 104 adds the SCI to new session context mapping to its session context database. In step 610, session manager 104 adds the unique identifier to a Record-Route header. In step 612, session manager 104 inserts the Record-Route header in the outbound request message. In step 614, session manager 104 routes the outbound request message.

Returning to step 602, if the request is not a new session creation request, control proceeds to step 616 where the session manager fetches the unique identifier from the topmost route header or route URI. In step 618, session manager 104 determines whether a unique identifier was located. If a unique identifier was located, control proceeds to step 620 where the session manager uses the unique identifier to generate or obtain an SCI. In step 622, session manager 104 looks up the session context using the SCI. In step 624, session manager 104 determines whether a session context was found. If a session context was found, control proceeds to step 625, where session manager 104 processes the request. Control then proceeds to step 626 where session manager 104 determines whether the session context has a unique identifier. If the session context has a unique identifier, control proceeds to step 610 where session manager 104 adds the unique identifier to a Record-Route header. Control then proceeds to step 612 where session manager 104 inserts the Record-Route header in the outbound request. Control then proceeds to step 614 where session manager 104 routes the outbound request. If the session does not have a unique identifier in step 626, session manager 104 inserts the Record-Route header as is in the outbound request and routes the request. Routing the request may include forwarding the outbound request to the SIP node identified in the topmost Route header.

Returning to step 618, if no unique identifier is found, control proceeds to step 628 where the session manager looks up the session without the SCI. Control then proceeds to step 624 where it is determined whether a session context was found. If a session context was found, session manager 104 executes steps 624-626 and 610-614 to process the request, insert the unique identifier in the Record-Route header of the outbound request and route the outbound request. Returning to step 624, if no session context is found, control proceeds to step 630 where a 4xx error response is generated.

Figure 7:
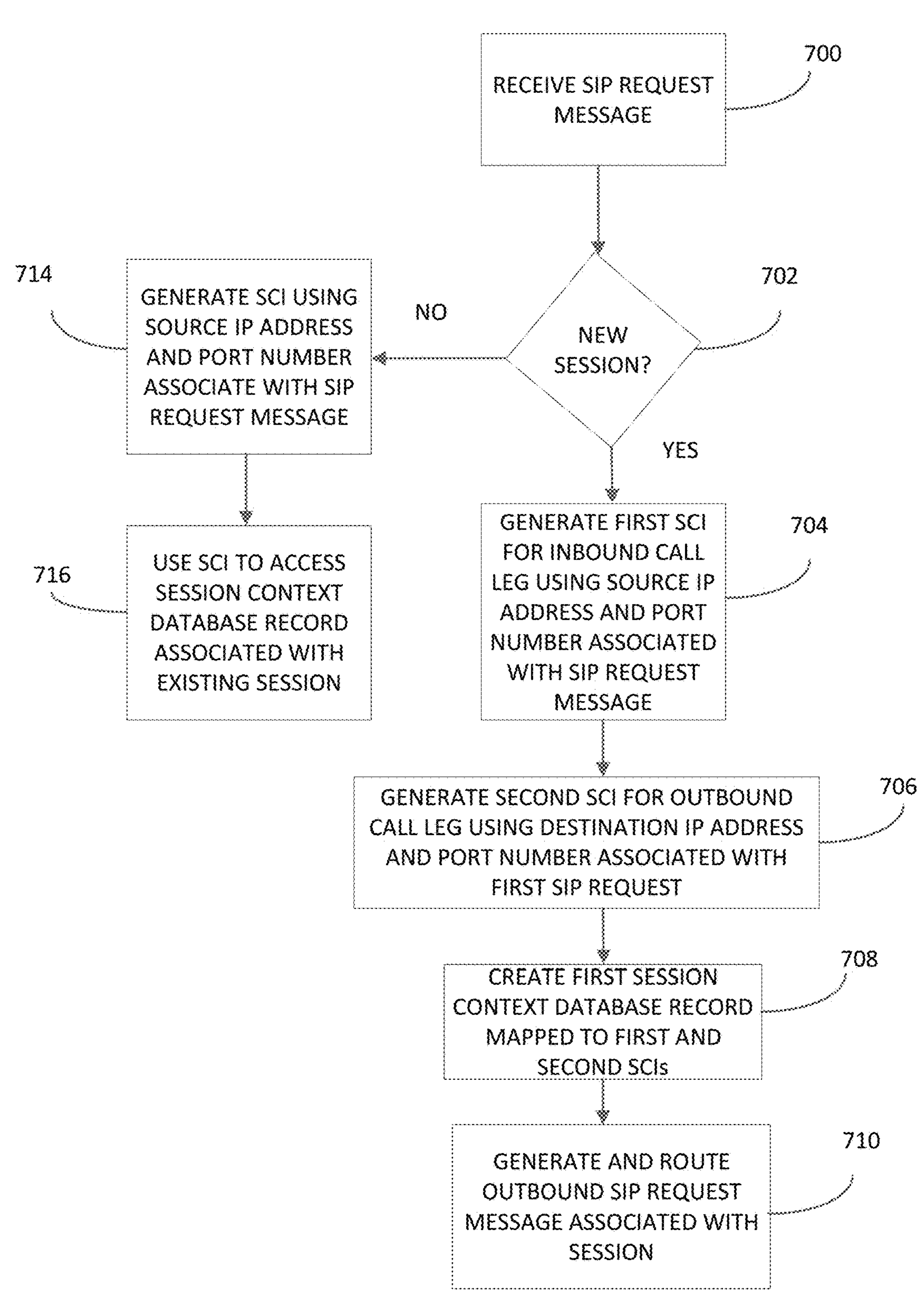
FIG. 7 is a flow chart illustrating an exemplary process for generating, communicating, and using a session context identifier.

FIG. 7 is a flow chart illustrating an exemplary process for generating and using a unique session context identifier for the case illustrated in FIGS. 3A and 3B where the session manager generates the SCI using IP addresses and port numbers associated with SIP request messages. Referring to FIG. 7, in step 700, a SIP request message is received. In step 702, the session manager determines whether the SIP request message is a request fora new session or subscription (such as an INVITE message or a SUBSCRIBE message). If the request is for a new session or subscription, control proceeds to step 704 where the session manager generates a first SCI for the inbound call leg using the source IP address and port number associated with the SIP request message. Control then proceeds to step 706 where the session manager generates a second SCI for the outbound call leg using the destination IP address and port number associated with the first SIP request message. Control then proceeds to step 708 where the session manager creates a first session context database record mapped to the first SCI and a second session context database record mapped to the second SCI. Control then proceeds to step 710 where the session manager generates and routes an outbound SIP request message associated with the session.

Returning to step 702, if the SIP request message is not a request associated with a new session, i.e., the SIP request message is a subsequent request message associated with an existing session, control proceeds to step 714 where the session manager generates an SCI using the source IP address and port number associated with the SIP request message. Control then proceeds to step 716 where the session manager uses the SCI to access the session context database record associated with the existing session.

Figure 8:
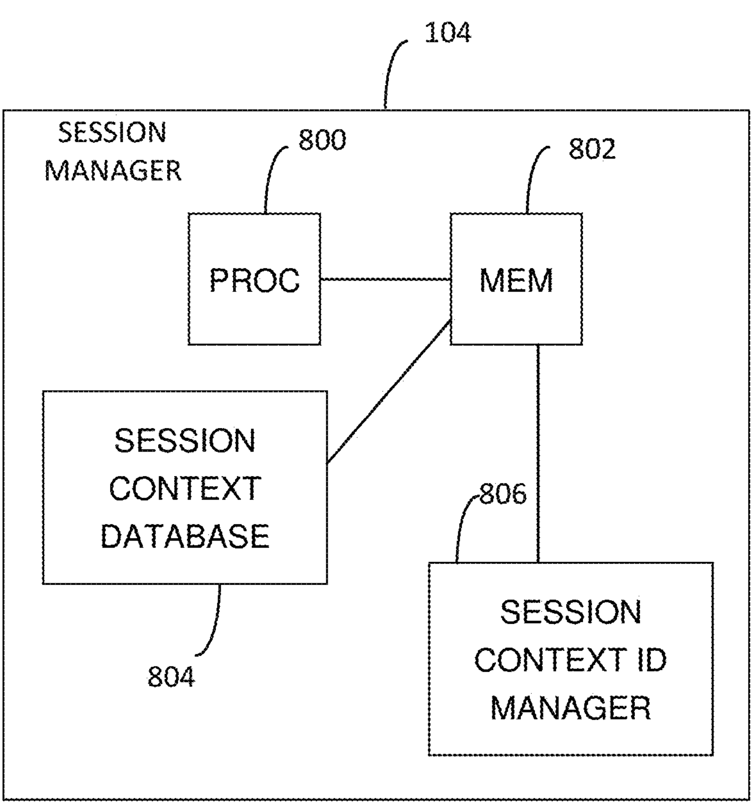
FIG. 8 is a block diagram illustrating an exemplary architecture for a session manager capable of generating, communicating, and using a session context identifier.

FIG. 8 is a block diagram illustrating an exemplary architecture for session manager 104. Referring to FIG. 8, session manager 104 includes at least one processor 800 and memory 802. Session manager 104 further includes a session context database 804 maintained in memory 802 which stores session context information indexed by corresponding session context identifiers. Session manager 104 further includes a session context ID manager 806 that performs the steps described above for generating unique session context identifiers for requests for new sessions, inserting the unique session context identifiers in Record-Route headers of outbound messages, and using unique session context identifiers in route headers of received SIP request messages to uniquely identify session contexts. Session context identification manager 806 may be implemented using computer executable instructions stored in memory 802 and executed by processor 800.

The disclosure of each of the following references is hereby incorporated herein by reference in its entirety.

REFERENCES

1. Handley et al., SIP: Session Initiation Protocol, IETF RFC 2543 (March 1999).
2. Rosenberg et al., SIP: Session Initiation Protocol, IETF RFC 3261 (June 2002).

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for identifying session contexts for handling spiral calls the method comprising:
   at a session initiation protocol (SIP) session manager:
      receiving, from a first node, a first SIP request message for establishing a first session or subscription;
      determining that the first SIP request message is a request for establishing a new session or subscription;

in response to determining that the first SIP request message is a request for establishing a new session or subscription, generating a first unique identifier;

using the first unique identifier as or to generate a first session context identifier that uniquely identifies the first session;

creating a first session context database record for the first session or subscription;

inserting the first unique identifier in a Record-Route header, wherein the presence of the Record-Route header in the first outbound SIP request message causes SIP user agent clients and SIP user agent servers that receive the first outbound SIP request message to copy contents of the Record-Route header, including the first unique identifier, to a Route header for subsequent requests relating to the first session;

adding the Record-Route header to a first outbound SIP request message; and routing the first outbound SIP request message;

receiving a second SIP request message for establishing a second session and including a Call-Id parameter equal to a Call-Id parameter in the first SIP request message and a From header tag equal to a From header tag in the first SIP request message, wherein the second session comprises a spiral call or session;

determining that the second SIP request message is a request for establishing a new session;

in response to determining that the second SIP request message is a request for establishing a new session, generating a second unique identifier;

using the second unique identifier as or to generate a second session context identifier that uniquely identifies the second session and is different from the first session context identifier;

creating a second session context database record for the second session:

inserting the second unique identifier in a Record-Route header;

adding the Record-Route header to a second outbound SIP request message; and routing the second outbound SIP request message.

2. The method of claim 1 wherein receiving the first SIP request message includes receiving a SIP INVITE message for establishing the first session.

3. The method of claim 1 wherein receiving the first SIP request message includes receiving a SIP SUBSCRIBE message for establishing the first subscription.

4. The method of claim 1 wherein using the first unique identifier as or to generate the first session context identifier includes using the first unique identifier as the first session context identifier.

5. The method of claim 1 wherein using the first unique identifier as or to generate the first session context identifier includes using the first unique identifier in combination with SIP header parameters to generate the first session context identifier.

6. The method of claim 1 wherein inserting the first unique identifier in the Record-Route header includes inserting the first unique identifier in a uniform resource identifier (URI) of the Record-Route header.

7. The method of claim 1 comprising:

at the SIP session manager:

receiving a third SIP request message;

determining that the third SIP request message is not a request for establishing a new session or subscription;

reading the second unique identifier from the Route header of the third SIP request message;

using the second unique identifier as or to determine the second session context identifier;

using the second session context identifier to access the second session context database record; and updating the second session context database record.

8. A system for identifying session contexts for handling spiral calls, the system comprising:

a session initiation protocol (SIP) session manager including at least one processor implemented in hardware and a memory;

a session context identification manager comprising computer-executable instructions stored in the memory and executable by the at least one processor of the SIP session manager for:

receiving, from a first node, a first SIP request message, determining that the first SIP request message is a request for establishing a new session or subscription;

in response to determining that the first SIP request message is a request for establishing a new session or subscription, generating a first unique identifier;

using the first unique identifier as or to generate a first session context identifier that uniquely identifies the first session;

creating a first session context database record for the first session or subscription;

inserting the first unique identifier in a Record-Route header;

adding the Record-Route header to a first outbound SIP request message, and;

routing the first outbound SIP request message, wherein the presence of the Record-Route header in the first outbound SIP request message causes SIP user agent clients and SIP user agent servers that receive the first outbound SIP request message to copy contents of the Record-Route header, including the first unique identifier, to a Route header for subsequent requests relating to the first session;

receiving a second SIP request message for establishing a second session and including a Call-Id parameter equal to a Call-Id parameter in the first SIP request message and a From header tag equal to a From header tag in the first SIP request message, wherein the second session comprises a spiral call or session;

determining that the second SIP request message is a request for establishing a new session;

in response to determining that the second SIP request message is a request for establishing a new session, generating a second unique identifier;

using the second unique identifier as or to generate a second session context identifier that uniquely identifies the second session and is different from the first session context identifier;

creating a second session context database record for the second session;

inserting the second unique identifier in a Record-Route header;

adding the Record-Route header to a second outbound SIP request message; and routing the second outbound SIP request message.

9. The system of claim 8 wherein the first SIP request message comprises a SIP INVITE message for establishing the first session.

10. The system of claim 8 wherein the first SIP request message comprises a SIP SUBSCRIBE message for establishing the first subscription.

11. The system of claim 8 wherein the session context identification manager comprises computer executable instructions stored in the memory and executable by the at least one processor for causing the SIP session manager to use the first unique identifier as the first session context identifier.

12. The system of claim 8 wherein the session context identification manager comprises computer executable instructions stored in the memory and executable by the at least one processor for causing the SIP session manager to use the first unique identifier in combination with SIP header parameters to generate the first session context identifier.

13. The system of claim 8 wherein the session context identification manager comprises computer executable instructions stored in the memory and executable by the at least one processor for causing the SIP session manager to insert the first unique identifier in a uniform resource identifier (URI) of the Record-Route header.

14. The system of claim 8 wherein the session context identification manager comprises computer executable instructions stored in the memory and executable by the at least one processor for causing the SIP session manager to:

receive a third SIP request message;

determine that the third SIP request message is not a request for establishing a new session or subscription;

read the second unique identifier from the Route header of the third SIP request message;

use the second unique identifier as or to determine the second session context identifier;

use the second session context identifier to access the second session context database record; and update the second session context database record.

15. The system of claim 8 wherein the SIP session manager comprises a SIP call stateful proxy.

16. A non-transitory computer readable medium having stored thereon executable instructions that when executed by a processor of a computer control the computer to perform steps comprising:

at a session initiation protocol (SIP) session manager:

receiving, from a first node, a first SIP request message;

determining that the first SIP request message is a request for establishing a new session or subscription;

in response to determining that the first SIP request message is a request for establishing a new session or subscription, generating a first unique identifier;

using the first unique identifier as or to generate a first session context identifier;

creating a first session context database record for the first session or subscription;

inserting the first unique identifier in a Record-Route header;

adding the Record-Route header to a first outbound SIP request message, wherein the presence of the Record-Route header in the first outbound SIP request message causes SIP user agent clients and SIP user agent servers that receive the first outbound SIP request message to copy contents of the Record-Route header, including the first unique identifier, to a Route header for subsequent requests relating to the first session; and routing the first outbound SIP request message;

receiving a second SIP request message for establishing a second session and including a Call-Id parameter equal to a Call-Id parameter in the first SIP request message and a From header tag equal to a From header tag in the first SIP request message, wherein the second session comprises a spiral call or session;

determining that the second SIP request message is a request for establishing a new session;

in response to determining that the second SIP request message is a request for establishing a new session, generating a second unique identifier, wherein generating the second unique identifier includes generating the second unique identifier using a second random number or a second unique cookie value respectively differing from the first random number or the first unique cookie value;

using the second unique identifier as or to generate a second session context identifier that uniquely identifies the second session and is different from the first session context identifier;

creating a second session context database record for the second session;

inserting the second unique identifier in a Record-Route header;

adding the Record-Route header to a second outbound SIP request message; and routing the second outbound SIP request message.

* * * * *